Oct. 9, 1934.        M. K. LAWLER        1,976,448
MEAT SOAKING MECHANISM
Filed Jan. 16, 1932        3 Sheets-Sheet 1

Michael K. Lawler
INVENTOR

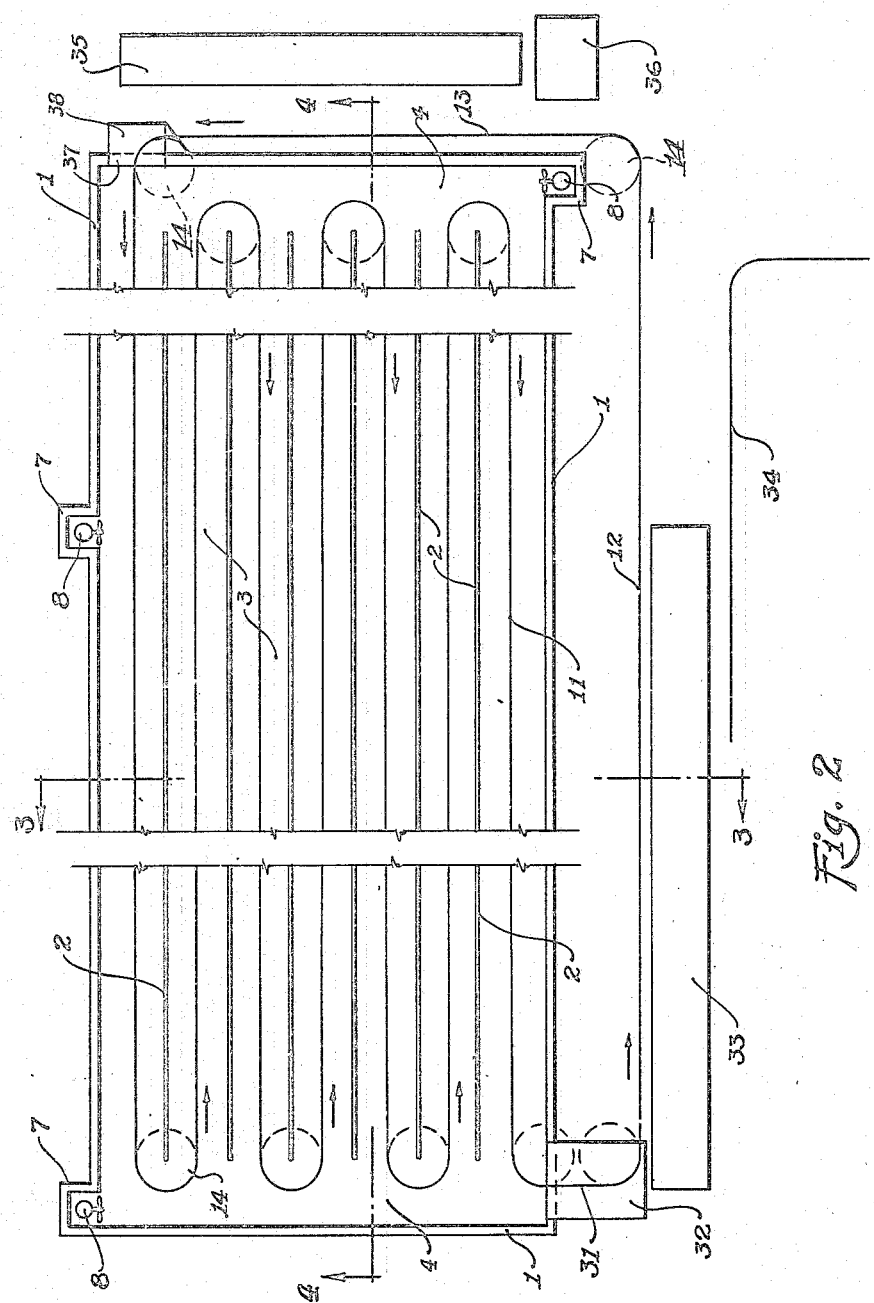

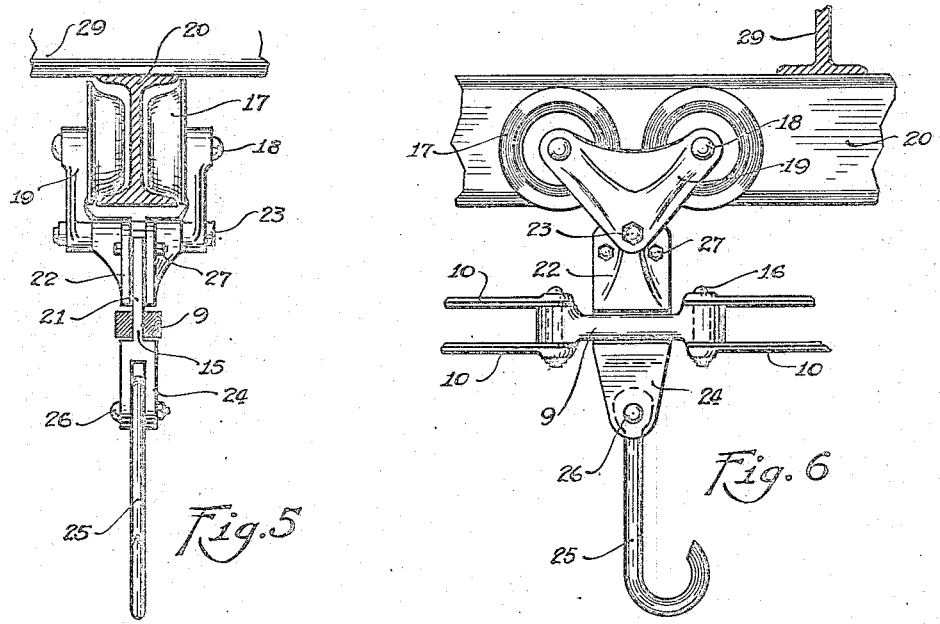

Patented Oct. 9, 1934

1,976,448

UNITED STATES PATENT OFFICE 1,976,448

MEAT-SOAKING MECHANISM

Michael K. Lawler, Chicago, Ill., assignor to Swift and Company, Chicago, Ill., a corporation of Illinois Application January 16, 1932, Serial No. 587,135

11 Claims. (Cl. 17—1)

This invention relates to a meat-soaking mechanism.

The object of the present invention is to provide a simple, practical and efficient meat-soaking mechanism of strong, durable and comparatively inexpensive construction designed for soaking hams and other meats and capable of handling simultaneously a large number of separate pieces of meat and of carrying them through the soak water of a vat submerged therein for a predetermined length of time and of automatically removing the meat from the vat and transferring the same to a conveyor to permit the performance of other operations upon the meat, such as spraying, scraping, branding and the like.

A further object of the invention is to provide meat-soaking mechanism of this character adapted to enable hams or other products to be conveniently and rapidly suspended from conveying mechanism and quickly transferred from the mechanism to a trolley after the soaking and other operations have been completed and the hams are in a finished condition.

With these and other objects in view, the invention consists in the novel construction, combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings:

Figure 2 is a plan view of the meat-soaking mechanism, parts being shown diagrammatically.

Figure 3 is a transverse sectional view on the line 3—3 of Figure 2.

Figure 4 is a longitudinal sectional view taken substantially on the line 4—4 of Figure 2.

Figure 5 is a detail sectional view illustrating the construction of the traveling hangers and the manner of mounting and guiding the same.

Figure 6 is a side elevation of the mechanism shown in Figure 5.

Figure 1:
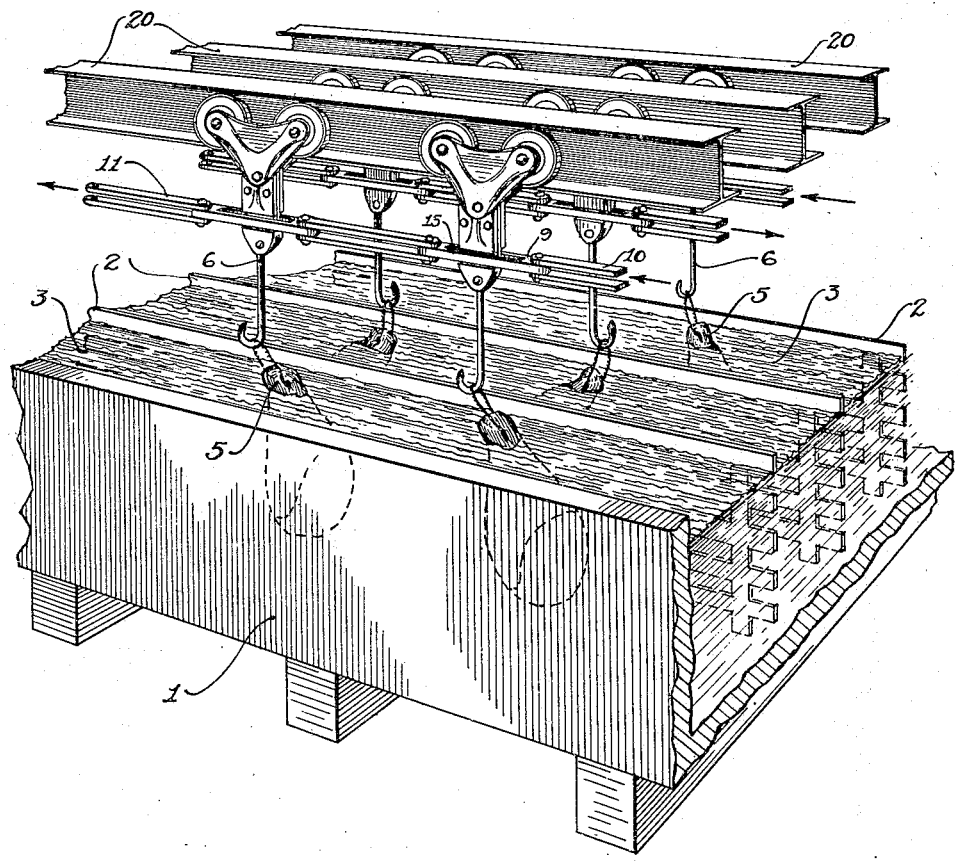
Figure 1 is a perspective view of a portion of a meat-soaking mechanism constructed in accordance with this invention.

In the accompanying drawings in which is illustrated the preferred embodiment of the invention, 1 designates a substantially oblong meat-soaking vat constructed of any suitable material and provided with spaced longitudinal partitions 2 constituting baffles and forming parallel longitudinal channels 3 and terminating short of the ends of the vat to form transverse connecting spaces or passages 4. The hams 5, which are suspended by traveling hangers 6 from a main endless conveyor 11, enter the vat 1 at one end thereof and are carried through the soak water in a submerged condition longitudinally of the vat in the said channels. The hams travel back and forth in the soak water from one end of the vat to the other and are transferred by the said endless conveyor from one longitudinal channel to another at the transverse end spaces or passages until the hams pass through each of the channels and reach the corner diagonally opposite the corner where the hams enter the vat. The endless conveyor is designed to be timed to subject the hams or other products to the action of the soak water, the desired length of time depending on the character and condition of the meat.

The vat is preferably composed of a horizontal bottom and vertical side and end walls, and the partitions 2 which are vertical are designed to be constructed of flat-iron or sheet metal or any other suitable material and the upper edges of the partitions 2 are located in a plane below the upper edges of the side and end walls of the vat. The vat is provided at diagonally opposite corners and at an intermediate point with offset portions 7 of rectangular form having side and outer walls and open at their inner sides to communicate with the vat.

These offset portions 7 which may be of any desired number are provided with suitable agitators 8 which cause a circulation of the soak water through the channels and passages of the vat. These agitators 8 may be of any desired construction and any desired number of the same to produce the required or desired agitation of the soak water may be provided. The main endless conveyor preferably consists of links 9 and connecting links or plates 10. The conveyor's course consists of inner longitudinal flights 11 and outer longitudinal and transverse flights 12 and 13 and are arranged on suitable guide pulleys consisting of sprocket wheels 14 located at the ends of the longitudinal channels 3 and at the ends of the outer longitudinal and transverse flights 12 and 13 for guiding the chain of the main endless conveyor. The links 9 are provided with openings 15 through which portions of the traveling hangers pass and the links or plates 10 are arranged in pairs at the upper and lower faces of the links 9 and are connected to the same by vertical pivots 16 as clearly illustrated in Figure 6 of the drawings.

The traveling hangers which support the flights of the main endless conveyor comprise side trolley wheels 17 arranged in pairs as clearly illustrated in Figure 6 of the drawings and mounted on suitable pivots or axles 18 carried by approximately triangular side plates 19. The trolley wheels which have a slight taper, as clearly shown in Figure 5 run on the lower flanges of I-beams 20 constituting rails for the trolley wheels and forming guides for the traveling hangers and supports for the same and the flights of the main endless conveyor are suspended by means of the traveling hangers from the I-beams.

The traveling hangers which constitute elements of the main endless conveyor are connected with the links 9 by a vertical connecting bar 21 extending through the opening 15 of the link 9 and secured between a pair of plates 22 arranged at opposite sides of the upper portion of the vertical connecting bar 21 and hung from the triangular side plates 19 by a transverse pivot bolt 23. The lower portion 24 of the vertical connecting bar 21 is enlarged to form shoulders to fit against the lower edges of the side portions of the link 9 and bifurcated to receive a suspension hook 25 pivoted at the upper end of its shank in the slot or bifurcation of the enlarged portion 24 by a transverse pivot bolt 26 or other suitable pivot. In assembling the parts of the traveling hanger, the vertical connecting bar 21 is passed upwardly through the opening 15 in the link 9 and is secured between the plates 22 by bolts 27. The lower edges of the plates 22 are located above the upper edges of the side portions of the link 9 and cooperate with the enlarged portion 24 of the bar 21 to form side recesses to receive the said side portions of the link 9. By this construction, the traveling hangers or trolley portions of the main endless conveyor are detachably connected with the endless chain of the said main conveyor and the parts may be readily separated and assembled.

The sprocket wheels 14 are suitably suspended from the I-beams by vertical shafts 28 which may be mounted on the I-beams in any desired manner and any suitable means may, of course, be employed for actuating the endless chain of the main conveyor at the desired speed. The I-beams are suitably secured to transverse I-beams 29 which have inclined portions 30 at the discharge side of the vat for inclining a short transverse flight 31 of the endless chain. The short transverse flight 31 of the endless chain extends upwardly and outwardly and is adapted to lift the hams and carry them over an inclined skid-plate 32 for automatically transferring the hams from the vat to an outer longitudinally disposed slat conveyor 33 which in practice will be synchronized with the main conveyor and which will afford sufficient time for the hams to be sprayed, scraped and branded while they are traveling along the outer side conveyor 33 and after which they are hung on a trolley 34 indicated diagramatically in Figure 2 of the drawings and located at the discharge side of the vat as shown. The trolley extends from the discharge end of the slat conveyor and is designed to carry the hams away from the meat-soaking mechanism to the desired point for the further handling of such product. The slat conveyor and the trolley may be of any desired construction as will be readily understood and it will be clear that as the slat conveyor travels at the same speed as the main conveyor, the hams or other meat products will be finished as rapidly as they leave the vat and will not accumulate on the slat conveyor.

The meat-soaking mechanism is designed to be provided at the receiving end of the vat with a suitable table 35 to receive the hams as they are transferred from a ham truck 36 indicated diagrammatically in Figure 2 of the drawings. The hams may be conveniently and rapidly removed from the table 35 and hung on the traveling hangers of the transverse flight 13, passing into the tank 1 through opening 37 over shelf 38. The sprocket wheels adjacent the short transverse flight 31 and guiding the same are set at a slight inclination by means of the inclined portion 30 of the adjacent supporting I-beam.

The exteriorly arranged slat conveyor is set at an inclination and is laterally inclined downwardly and outwardly as clearly illustrated in Figure 3 of the drawings to facilitate the treatment of the hams, and a platform 39 is preferably provided at the outer side of the slat conveyor for the accommodation of the operators in the finishing treatment of the hams.

What is claimed is:

1. A meat-soaking mechanism including a soaking vat having a plurality of serially and sinuously arranged communicating longitudinally extending channels, an endless conveyor for carrying hams or other meats through the channels in a substantially submerged position and a rail support from which the endless conveyor is supported and along which the endless conveyor travels, said conveyor comprising an endless chain having inner longitudinally extending flights serially and sinuously arranged over said channels, an outer longitudinally extending flight located above but at one side of the vat, a transversely extending flight leading from one of the inner longitudinally extending flights over a longitudinally extending side edge of the vat to the outer longitudinally extending flight, and an outer transversely extending flight leading from the outer longitudinally extending flight to an inner longitudinally extending flight, said endless chain having traveling hangers therefor and meat supporting means carried from said hangers, said hangers being the members that are mounted upon and that travel along the rail support.

2. A meat-soaking mechanism as defined in and by claim 1 in which the rail support has a portion that extends upwardly and outwardly for causing an upward and outward movement for the transversely extending section of the conveyor that extends from an inner longitudinally extending flight to the outer longitudinally extending flight.

3. A meat-soaking mechanism as defined in and by claim 1, in which there is an upwardly and outwardly extending skip slide located below the transversely extending section of the conveyor that leads from an inner longitudinally extending flight to the outer longitudinally extending flight.

4. A meat-soaking mechanism as defined in and by claim 1, in which there is an upwardly and outwardly extending skip slide located below and in cooperative arrangement with the transversely extending section of the conveyor that leads from an inner longitudinally extending flight to the outer longitudinally extending flight, and in connection with which said meat soaking mechanism there is a longitudinally extending slat conveyor that is located outside of the vat but in transversely spaced relationship in respect to a longitudinally extending side of the vat, which slat conveyor is arranged so as to receive hams or other meats delivered thereupon from said skip slide.

5. A meat-soaking mechanism as defined in and by claim 1, in which there is a longitudinally extending slat conveyor that is located outside of the vat but which is transversely spaced relative to a longitudinal side of the vat, which slat conveyor is arranged so as to receive hams or other meats caused to be delivered thereupon by the conveyor, said slot conveyor also being so arranged that in a transverse direction it slopes downwardly and outwardly.

6. A meat-soaking mechanism as defined in and by claim 1, in which the vat is provided with an upwardly and transversely extending slide arranged in cooperative association with the outer transversely extending flight that leads from the outer longitudinally extending flight to an inner longitudinally extending flight, whereby said slide can cooperate with the outer transversely extending flight in conducting hams or other meats into the vat.

7. A meat-soaking mechanism comprising a vat and an associated endless chain above the vat, which endless chain comprises inner longitudinally extending serially arranged flights directly above the vat, an outer longitudinally extending flight arranged above but at one side of the vat, a transversely extending flight leading from an inner longitudinally extending flight to said outer longitudinally extending flight, and an outer transversely extending flight leading from the outer longitudinally extending flight to an inner longitudinally extending flight.

8. A meat-soaking mechanism as defined in and by claim 7, in which there is a laterally and outwardly extending skip slide located in operative arrangement with respect to the transversely extending section or flight of the conveyor that extends from an inner longitudinally extending flight to the outer longitudinally extending flight and in which there is a longitudinally extending slat conveyor arranged in association with respect to said skip slide and the outer longitudinally extending flight.

9. A meat-soaking mechanism comprising a vat and associated endless conveyor, which conveyor has an inner longitudinally extending flight, an outer longitudinally extending flight and a transversely extending flight leading from the inner longitudinally extending flight to the outer longitudinally extending flight, and a longitudinally extending slat conveyor arranged to receive hams or other meats passing through and delivered thereupon by the conjoint effect of said transversely extending flight and the outer longitudinally extending flight.

10. In a meat-soaking mechanism provided with an outer transversely extending flight, an upwardly and transversely extending skip slide arrangement whereby incoming meats may be guided to the upper interior portion of the vat.

11. A meat-soaking mechanism comprising a soaking vat having a plurality of serially and sinuously arranged communicating channels defined by partitions, and an overhead sinuously arranged conveyor whereby meat suspended from said conveyor may be carried through said channels.

MICHAEL K. LAWLER.